June 21, 1955   C. H. MOSEBACH   2,711,315
SPRING SUSPENSION AND SHOCK ABSORBING DEVICES FOR AUTOMOBILES
Filed Feb. 26, 1952
2 Sheets-Sheet 1

Carl H. Mosebach
INVENTOR.

BY *Clarence A. O'Brien*
*and Harvey B. Jacobson*
Attorneys

June 21, 1955  C. H. MOSEBACH  2,711,315
SPRING SUSPENSION AND SHOCK ABSORBING DEVICES FOR AUTOMOBILES
Filed Feb. 26, 1952
2 Sheets-Sheet 2

Carl H. Mosebach
INVENTOR.

BY *Clarence A. O'Brien
and Harvey B. Jacobson*
Attorneys

United States Patent Office 2,711,315
Patented June 21, 1955

2,711,315

SPRING SUSPENSION AND SHOCK ABSORBING DEVICES FOR AUTOMOBILES

Carl H. Mosebach, Lancaster, Pa.

Application February 26, 1952, Serial No. 273,437

6 Claims. (Cl. 267—65)

My invention relates to improvements in spring suspension and shock absorbing devices for automobiles, and like vehicles.

The primary object of my invention is to combine in such devices combination coil and pneumatic spring casing suspension units and hydraulic shock absorbers, in a manner to overcome side sway of automobile bodies and lack of proper spring action under varying loads, particularly heavy loads, and when the automobile is travelling over rough and uneven roads and around curves.

Another object is to provide in such units supplemental pneumatic spring casings for coil springs arranged to provide, with said springs, for supporting the load with maximum efficiency and which are constructed in molded sections adapted to be connected together with the coil spring therein so as to hermetically seal the casings around the springs.

Still another object is to provide for securely anchoring the ends of pneumatic spring casings, and coil springs in the casings to the chassis frame and axle housing of an automobile so that the coil springs and casings may expand and contract vertically and flex freely laterally.

Still another object is to reenforce the pneumatic spring casings sufficiently at points of greatest stress and strain without interfering with the expanding and contracting action thereof.

Other and subordinate objects, within the purview of my invention, together with the precise nature of my improvements will be readily understood when the succeeding description and claims are read with reference to the drawings accompanying and forming part of this specification.

Figure 1:
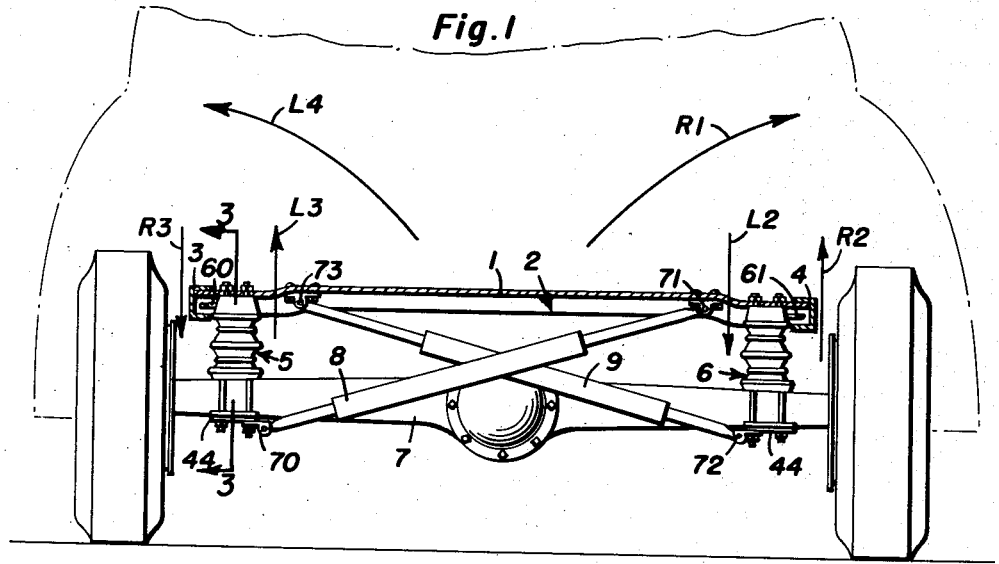
Figure 1 is a view in rear elevation, partly in section, illustrating the chassis frame of an automobile equipped with my improved spring suspension and shock absorbing devices, in the preferred embodiment thereof.
Figure 2:
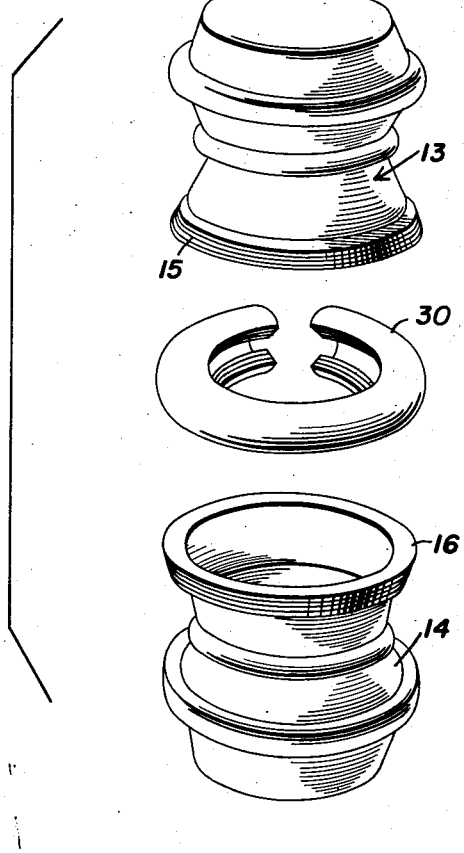
Figure 2 is a composite view in perspective of the parts of one of the pneumatic spring casings disassembled and drawn to a larger scale.
Figure 6:
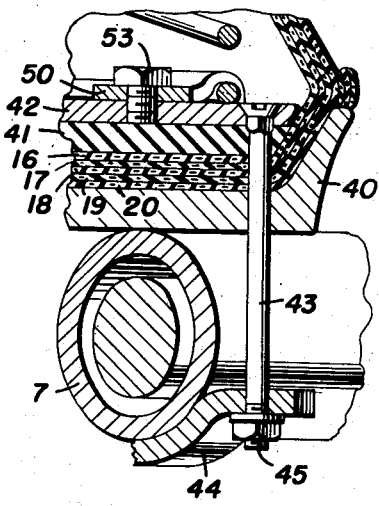
Figure 6 is a fragmentary view in vertical section taken on the line 6—6 of Figure 5.

Referring to the drawings by numerals, according to my invention, as illustrated, the rear end 1 of an automobile chassis frame 2 is supported at the rear left and right sides, or corners 3, 4 of said frame by a pair of left and right combination coil and pneumatic spring casing units 5, 6 supported on the rear axle housing 7, and a pair of hydraulic shock absorbers 8, 9 are associated with said units 5, 6 in diagonally crossed relation to function in an novel manner in conjunction with said units 5, 6, as will presently be described. The combination coil spring and pneumatic spring casing units 5, 6 being duplicates, a description of one, for instance unit 5, will suffice for both. Said unit 5 comprises a vertically elongated, hollow pneumatic spring casing 10 of circular cross-section having flat upper and lower closed end portions 11, 12 of truncated cone shape in cross-section, said casing being of accordion pleated form circumferentially between said end portions 11, 12 and formed in upper and lower half sections 13, 14 with opposed circumferential, external flanges 15, 15' connected in a manner presently described in the transverse center of said casing so that said casing encloses a coil spring 17. The wall of the pneumatic spring casing 10 is formed of plies of reenforced flexible material, such as cord fabric, there being five plies 16, 17, 18, 19, 20 at the lower end portion 12 of said casing, four plies 21, 22, 23, 24 at the upper end portion 11 and three plies 22', 23', 24' between said end portions 11, 12, as clearly shown in Figure 3, said portions being thus adequately reenforced against stress and strain occuring throughout said portions. The sections 13, 14 are formed by molding and vulcanizations in suitable apparatus, not shown.

A circumferentially and transversely split binder ring 30 of the same material as the wall of the casing 10 straddles the flanges 15, 15' of the sections 13, 14 and said binder ring and flanges 15, 15' are vulcanized to form an air tight joint between said sections. As will be understood, the binder ring 30 is split as described for positioning over the flanges 15, 15' and serves as an additional reenforcement where said sections are connected.

Vertically spaced, external reenforcing binder rings 31, 32 circumposed around and vulcanized to the wall of said casing 10 at points of largest and smallest diameter reenforce said casing between the binder ring 30 and the upper and lower end portions 11, 12.

The combination coil spring and pneumatic spring casing units 5, 6 are anchored to the rear end 2 of the chassis frame 1, and to the axle housing 7 by like means, as regards each unit, and, therefore, a description of the anchoring means for unit 5 will suffice for both.

An inverted cup-shaped block 35 on the bottom of said end 2 at one side of the chassis frame 1 seats the upper end portion of the casing 10 of said unit 5 therein. The upper end portion 11 is clamped between a rubber disk 36 in said upper end portion backed by a metal disk 37 in said end portion, the clamping being accomplished by means of screw bolts 38 extending through said disks 36, 37 and end portion 11 and through said block 35 and rear end 2 and provided with nuts 39 on top of said rear end.

A cup-shaped block 40 seats therein and supports the lower end portion 12 of said casing 10 and which is clamped therein between the block and a rubber disk 41 in said portion 12 backed by a metal disk 42, the clamping being accomplished in this instance by screw bolts 43 extending through said disks 41, 42, portion 12, and block 40 on both sides of the axle housing 7 and which pass through shackle plates 44 extending across the bottom of the housing 7 with nuts 45 on said bolts.

As will be seen, because the bolts 38 pass through the upper end portion 11 and through the rubber disk 36 no leakage of air out of casing 10 around said bolts may occur, and the same advantage is obtained in connection with bolts 43 by passing the same through both the rubber disk 41 and the bottom end portion 12 of said casing 10.

The coil spring 17, which is of smaller diameter than the internal diameter of said casing 10 to clear the same and to expand and contract and flex laterally, freely, has its upper and lower convolutions 49, 50 clamped flat against the metal disks 37, 42, respectively, by channeled clamping plates 52, 53 fitting over said convolutions 49, 50 and bolted to the disks 37, 42 as at 54, 55.

Figure 3:
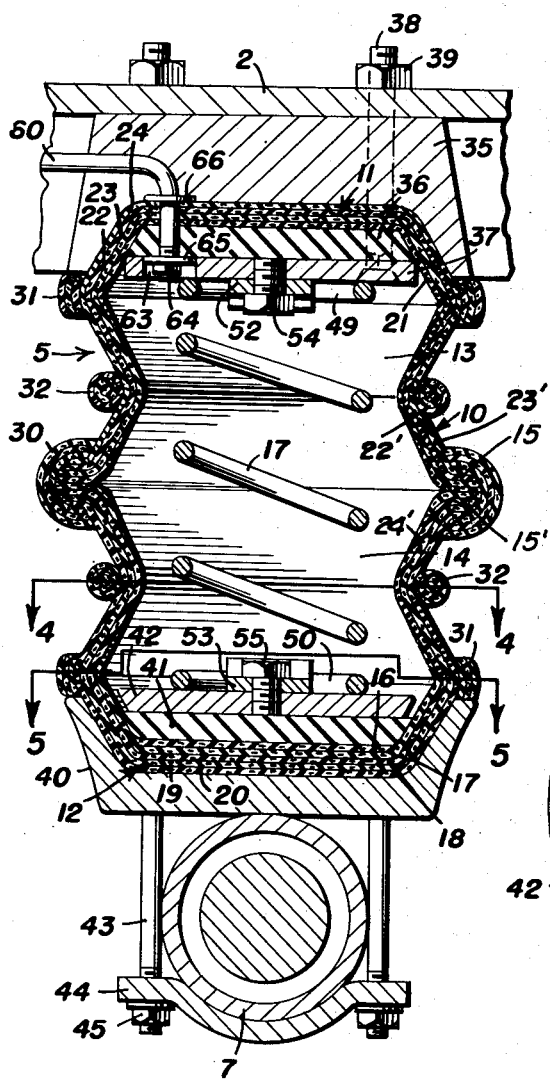
Figure 3 is an enlarged view in vertical section taken on the line 3—3 of Figure 1 and illustrating in detail the construction of one of the pneumatic spring casings and coil springs, also the anchoring means for the same.
Figure 4:
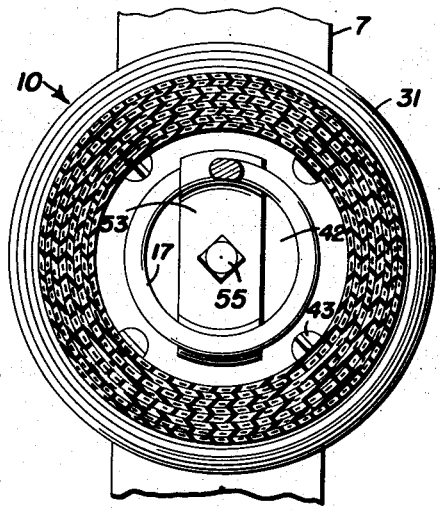
Figure 4 is a view in horizontal section taken on the line 4—4 of Figure 3.
Figure 5:
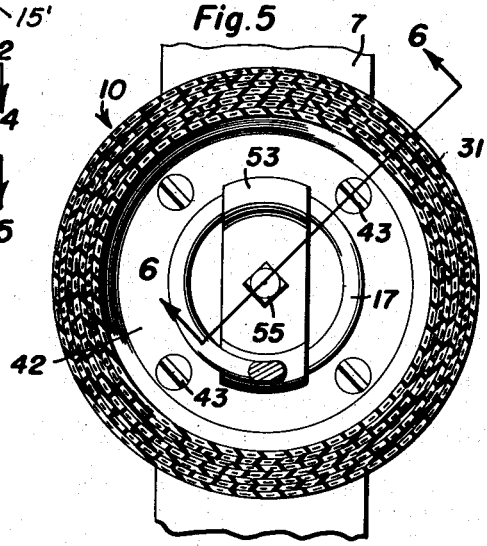
Figure 5 is another view in horizontal section taken on the line 5—5 of Figure 3.

Air inlet pipes 60, 61 from any suitable source of compressed air supply, not shown, on the automobile extend into the upper end portions 11, 12 of the units 5, 6, for instance as shown in Figure 3 wherein the inlet pipe 60 extends into a notch 62 in the block 35 through the upper end portion 11, disk 36 and into an opening 63 in the disk 31 and is securely fastened in place by a nut 64 and washer 65 in said opening 63, a sealing washer 66 being provided on said pipe 60 for engagement externally with the upper end portion 11.

The shock absorber 8 is associated with the coil spring and pneumatic spring casing unit 5 and with the right corner, or side 4 of the chassis frame 1 and for this purpose is pivotally connected at its ends, as at 70, 71 for vertical swinging movement to the shackle plates 44 and said right side, or corner 4. The shock absorber 9 is associated with the right coil spring and pneumatic spring casing unit 6 and the left side, or corner 3, of said frame 2, the pivotal connections being designated 72, 73, the pivotal connection 72 being on the shackle 44 of said unit 6 and the pivotal connection 73 being disposed at the relatively opposite side or corner, 3 of the chassis frame 1. Because of the previously described diagonal cross relation of the shock absorbers 8, 9 the same extends crosswise of the chassis frame between their pivotal connections. The shock absorbers 8, 9 may be of any conventional piston and cylinder type.

Referring now to the operation of the invention, with the combination coil spring and pneumatic spring casing units 5, 6 inflated through the pipes 60, 61 to a predetermined pressure, according to the load, different loads may be supported both by coil springs and supplemental air pressure regulated to supplement the coil springs so that the casings of said units may contract and expand vertically with the coil springs to attain efficient flexibility in the spring suspension without undue contraction of said units. With reference now to Figure 1, with the shock absorber 8 associated with the right unit 6, during a right turn, as indicated by the arrow R1, the pull exerted by centrifugal throw is toward the left while upward throw or pressure is exerted at the right of the chassis frame as indicated by arrow R2 and downward pressure is exerted at the left of the chassis frame as indicated by the arrow R3, these pressures being opposed by the shock absorbers 8 and 9 at their pivot connections 71, 73 as indicated by the arrows L2, L3 thus stabilizing the chassis frame 2. During a left turn, indicated by the arrow L4, the pull, under centrifugal throw is toward the right and upward pressure occurs at the left of the chassis frame as indicated by the arrow L3 while downward pressure occurs at the right as indicated by the arrow L2, these pressures being offset by the shock absorbers at the pivotal connections 73, 71 respectively. Side flexing of the units 5, 6 is checked by the shock absorbers 8, 9 in a manner which it is believed will be clear.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. Spring suspension devices for mounting an automobile chassis frame at opposite sides thereof on the axle housing of the automobile comprising a pair of elongated pneumatic accordion pleated spring casings of flexible material interposed between said frame and housing at opposite sides of the frame, in upright position, anchoring means securing the ends of said casings to said frame and housing respectively, an upright coil spring in each casing, clamps attaching the ends of each coil spring to the anchoring means for the casing, each spring being spaced from the side of the casing out of interfering relation to said side, and means to introduce air under pressure into said casings, and cushion members in the ends of each casing between said ends and the ends of the coil spring.

2. Spring suspension devices according to claim 1, said casings comprising, respectively, reenforcing external flexible rings surrounding and attached to the same at the points of largest and smallest diameter of said casing.

3. Spring suspension devices according to claim 1, said casings comprising respectively, plies of the flexible material molded together with a greater number of circumferential plies at the ends of each casing than between said ends.

4. Spring suspension devices according to claim 1, said anchoring means comprising cup shaped blocks seating the ends of said casings, said cushion means comprising resilient disks in the ends of said casings opposed to said blocks and metal disks opposed to said resilient disks and seating the ends of the coil springs with the ends of the coil springs attached thereto, and bolts extending through said disks and ends of the casings.

5. In a spring suspension for supporting a chassis frame on the axle housing of an automobile, an elongated pneumatic casing of circular cross-section having ends and an accordion pleated side wall and formed of plies of flexible reinforced material molded together with a greater number of plies at the ends of the casing than between said ends, and longitudinally spaced external reinforcing rings of flexible material surrounding and molded to said side wall, and means for introducing air under pressure into said casing, all of the plies at one end of the casing and some of the plies at the other end of the casing extending into the side wall and circumferentially thereof.

6. In a spring suspension according to claim 5, a coil spring in said casing, said casing comprising half sections molded together to enclose said spring.

References Cited in the file of this patent
UNITED STATES PATENTS

| | | |
|---|---|---|
| 1,479,282 | Burns | Jan. 1, 1924 |
| 1,550,151 | Cowey | Aug. 18, 1925 |
| 1,593,759 | Dixon | July 27, 1926 |
| 1,668,669 | Caldwell | May 8, 1928 |
| 2,056,106 | Kuhn | Sept. 29, 1936 |
| 2,226,605 | Geyer et al. | Dec. 31, 1940 |
| 2,257,913 | Maranville | Oct. 7, 1941 |